United States Patent [19]

Randhahn et al.

[11] Patent Number: 5,415,781
[45] Date of Patent: May 16, 1995

[54] DYNAMIC FILTER SEPARATOR AND SEPARATION PROCESS

[75] Inventors: Horst Randhahn, Darmstadt-Eberstadt; Hartmut Vogelmann, Dreieich; Michael Meister, Frankfurt, all of Germany

[73] Assignee: Pall Corporation, East Hills, N.Y.

[21] Appl. No.: 29,049

[22] Filed: Mar. 9, 1993

[30] Foreign Application Priority Data

Mar. 10, 1992 [DE] Germany ............ 42 07 614.5

[51] Int. Cl.⁶ .................. B01D 61/00; B01D 63/00
[52] U.S. Cl. ........................ 210/650; 210/321.63; 210/321.69; 210/321.75; 210/321.84; 210/413; 210/96.2; 210/232
[58] Field of Search ........... 210/650, 297, 456, 321.63, 210/321.69, 321.84, 415, 413, 484, 397, 391, 96.1, 96.2, 232, 321.64, 321.72, 321.75, 321.84, 649

[56] References Cited

U.S. PATENT DOCUMENTS

| 2,784,843 | 10/1954 | Braumlich | 210/456 |
|---|---|---|---|
| 3,499,533 | 10/1970 | Lopker | 210/456 |
| 3,631,654 | 1/1972 | Riely et al. | 55/522 |
| 3,838,774 | 10/1974 | Dolan et al. | 210/96.2 |
| 3,984,317 | 10/1976 | Donovan | 210/415 |
| 4,303,522 | 12/1981 | Ducasse | 210/456 |
| 4,995,977 | 2/1991 | Hilgendorff et al. | 210/321.69 |

FOREIGN PATENT DOCUMENTS 7314040 3/1973 Germany .

OTHER PUBLICATIONS

"Verfahren zur Mikrofiltration von Prozeslosungen und ihre Anwendungen"; Chem.-Ing.-Tech. 60 (1988) Nr. 3, S. 155–161.

Primary Examiner—Robert A. Dawson
Assistant Examiner—Ana M. Fortuna
Attorney, Agent, or Firm—Leydig, Voit & Mayer

[57] ABSTRACT

An apparatus and a method are provided for separating a feed fluid into a filtrate and a concentrate. A filtrate chamber is divided into several separate filtrate subchambers, each of which is connected to a different portion of a partially permeable wall or membrane to receive that part of the filtrate passing therethrough. A relative motion is induced between the feed fluid and the wall or membrane by a rotating part, thus preventing clogging of the membrane. Sensors are provided in the filtrate subchambers, permitting information about a dynamic separation process to be obtained.

23 Claims, 4 Drawing Sheets

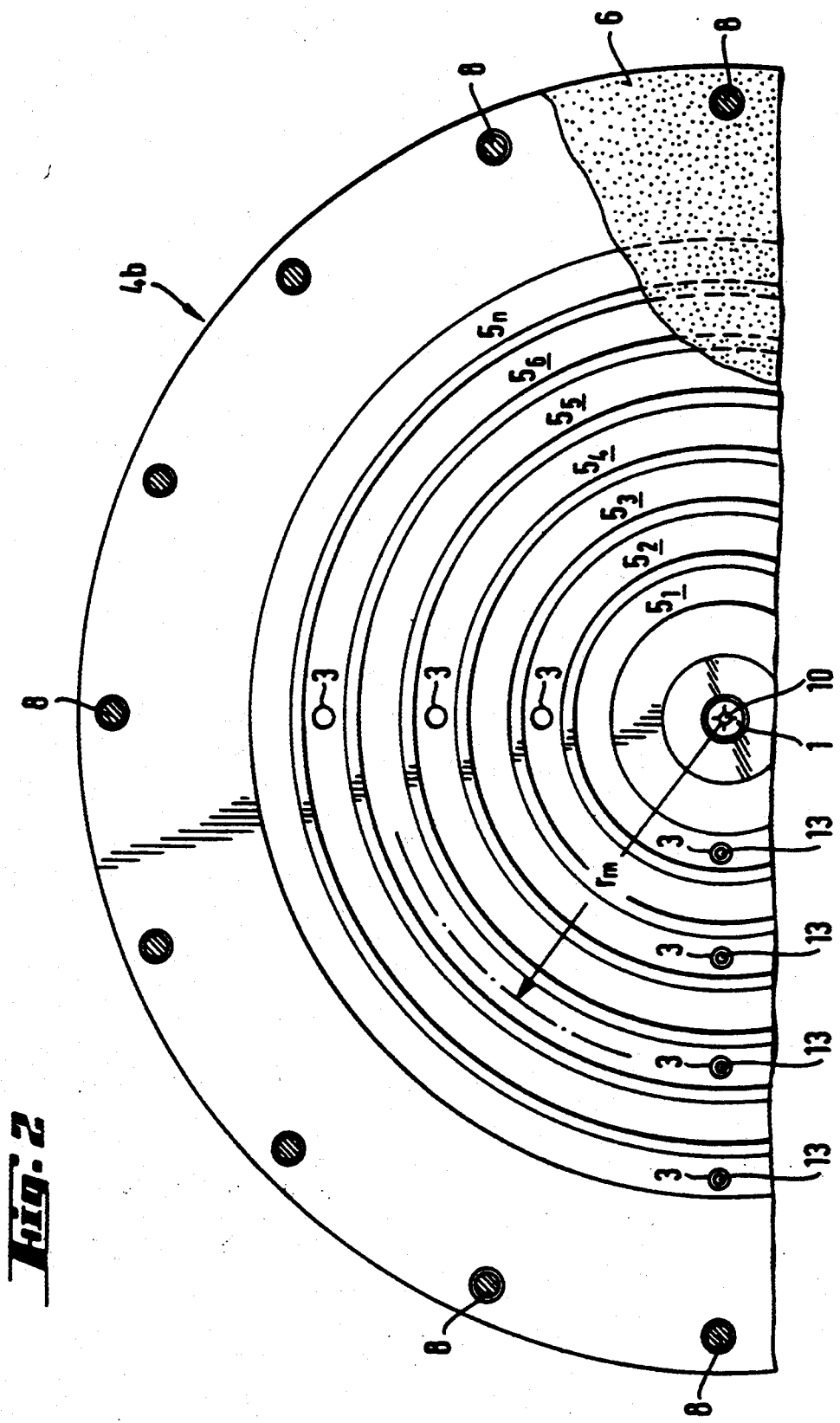

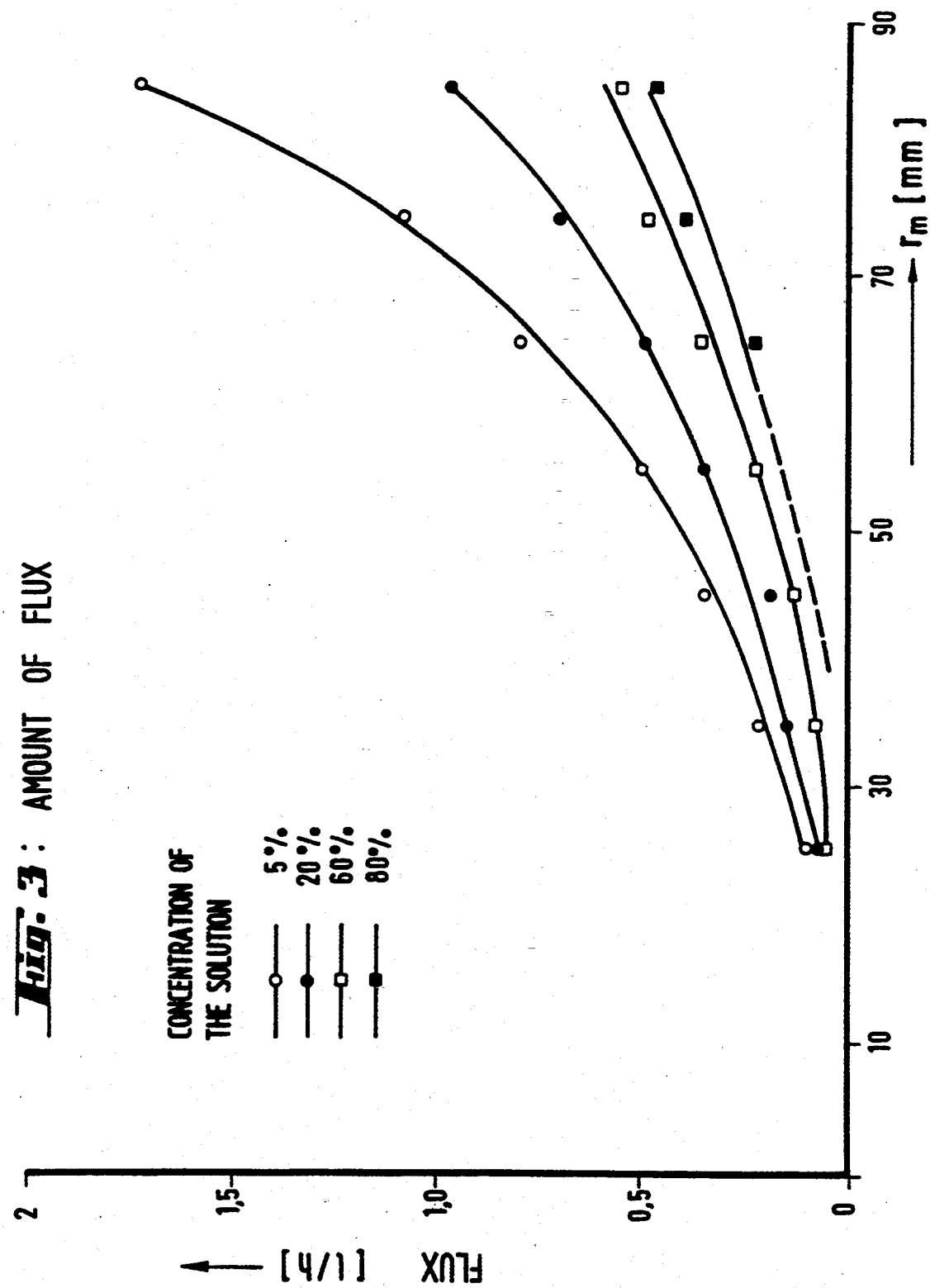

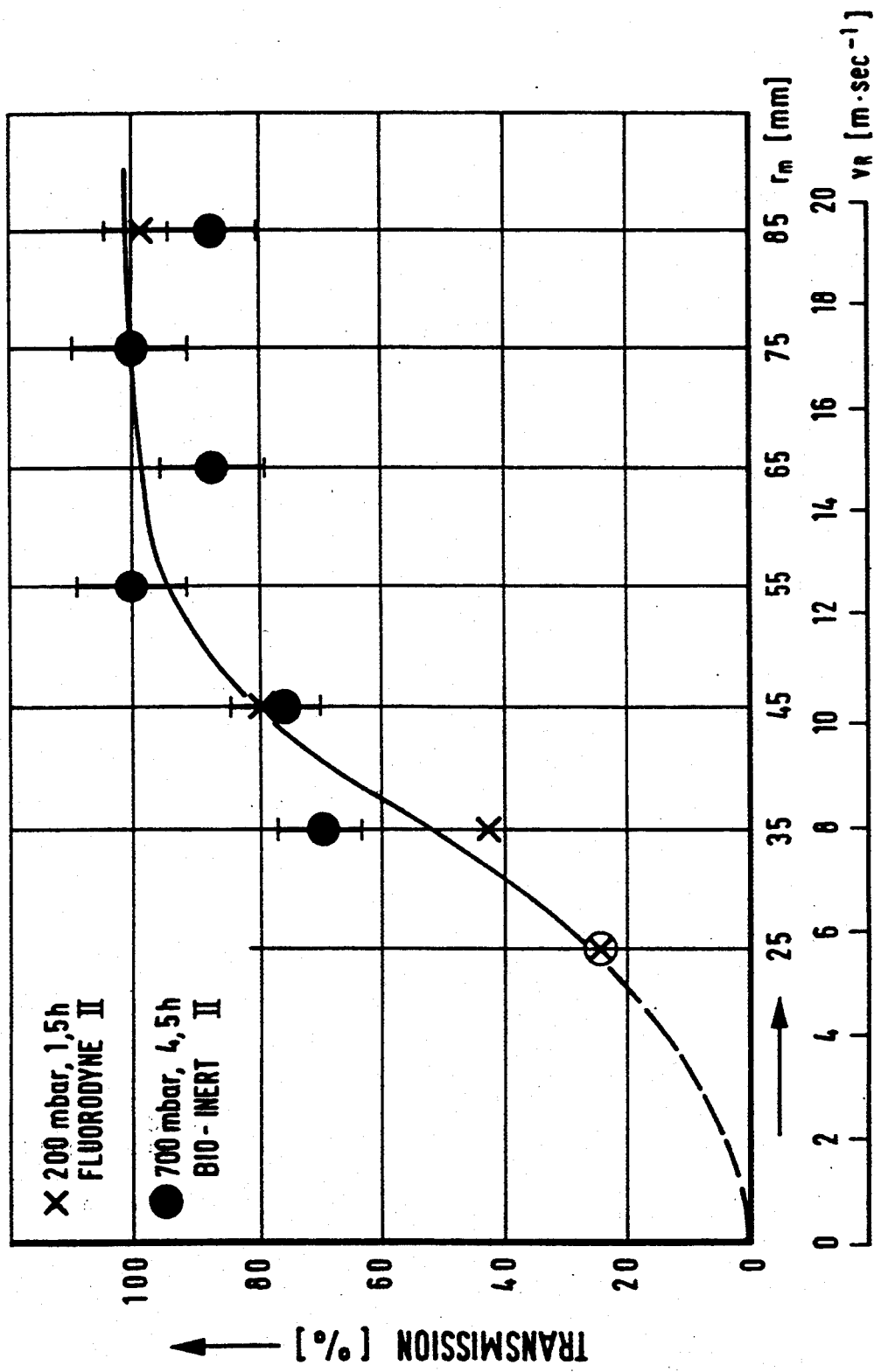

DYNAMIC FILTER SEPARATOR AND SEPARATION PROCESS

BACKGROUND OF THE INVENTION

The invention relates to an apparatus and a method for separating a feed fluid, particularly a suspension into a less concentrated or even pure phase (filtrate fluid) and a more concentrated phase (concentrate fluid).

In areas such as biotechnology, waste water treatment, pharmacy, medicine and the beverage industry, it is a frequent problem to separate solid particles from a feed fluid, such as enzymes or yeast in an aqueous solution, blood in plasma, or pulp from juice, etc.

Previously known dynamic filter separators work with a two chamber system. The feed fluid is impelled in a first chamber, called a concentrate chamber, which is separated from a second chamber, the filtrate chamber, by a partially permeable wall, e.g., a porous membrane or a semipermeable membrane. In the second chamber, the filtrate is collected from the whole plane of the membrane.

The concentrate chamber is connected to a feed fluid inlet and a concentrate fluid outlet, and the filtrate chamber is connected to a filtrate fluid outlet.

Such a filter is called dynamic when a relative motion of the suspension in the concentrate chamber along the membrane is induced by any means, such as a rotatable disk. Thus, clogging of the membrane pores is avoided or at least diminished.

In this state of the art the effect of different degrees of separation of the suspension at different locations at the membrane had not been taken into account. Any inhomogeneous behavior of the separation process due to, e.g., parameters of the feed fluid such as pressure, temperature, concentration or velocity in the concentrate chamber has not been considered.

SUMMARY OF THE INVENTION

One of the objects of this invention is to provide a dynamic filter separator with improved separation characteristics other than total separation efficiency.

A further object of this invention is to provide a dynamic filter separator which makes it possible to obtain more information about a dynamic separation process.

A still further object of this invention is to provide a dynamic filter separator as a tool for the development of a dynamic filter separator and a process specifically adapted to a particular separation problem.

The present invention provides a separator and method in which partial filtrate fluids are collected as a plurality of filtrate fluid streams in a plurality of separate, parallel partial filtrate chambers or filtrate subchambers. A filtrate chamber is divided into several filtrate subchambers, each of which is connected to a different portion of the partially permeable wall or membrane and receives that portion of the filtrate which passes therethrough.

Other features, modifications and applications of the separator and method of this invention are described in the claims.

This multi-chamber system provides a different kind of separation for a partial filtrate fluid in comparison to the mixed filtrate fluid that is received by a two-chamber system. Partial filtrate fluids then can, e.g., differ in the degree of separation. Thus, the feed fluid is separated differentially into a multitude of filtrate fluids with concentration, flow rates or other properties being different from one partial filtrate system to the next.

There are several advantages to this differential separation. A higher degree of separation for a partial stream can be obtained. The separation process itself can be investigated by analyzing the degree of separation depending on the location at the membrane where the filtrate fluid is connected as well as depending on other parameters, e.g., geometrical parameters (gap shape, surface structure of a rotatable element). It is preferred to install one or more sensors at the filtrate subchambers and/or concentrate chamber in order to monitor physical or chemical properties of the fluids, such as concentration, temperature, pressure or flow rate depending on the location in the chambers. In this case, a differential separation process does not have to be run by trial and error but can be controlled and predetermined systematically.

It is also possible to provide membranes with different properties for different partial filtrate chambers, such that the membrane is composed of a plurality of portions of different membranes. Therefore, the possibility of testing different membranes at the same time arises in order to find a membrane that best meets the special demands of the specific case.

Especially for testing and development purposes it is advantageous to build the housing of the filter separator of at least two parts, such that relevant parts (membrane, relative motion inducing means) for the separation process can easily be changed.

BRIEF DESCRIPTION OF THE DRAWINGS

FIGS. 1 and 2 show a preferred embodiment of a differential dynamic filter separator, FIG. 2 being a cross-sectional view along line II—II of the separator of FIG. 1.

FIG. 3 is a graph of flux through the ring channels of the embodiment of FIG. 1 as a function of radius.

FIG. 4 is a graph of transmission as a function of the radius of the ring channels of the embodiment of FIG. 1.

DESCRIPTION OF THE PREFERRED EMBODIMENTS

Figure 1:
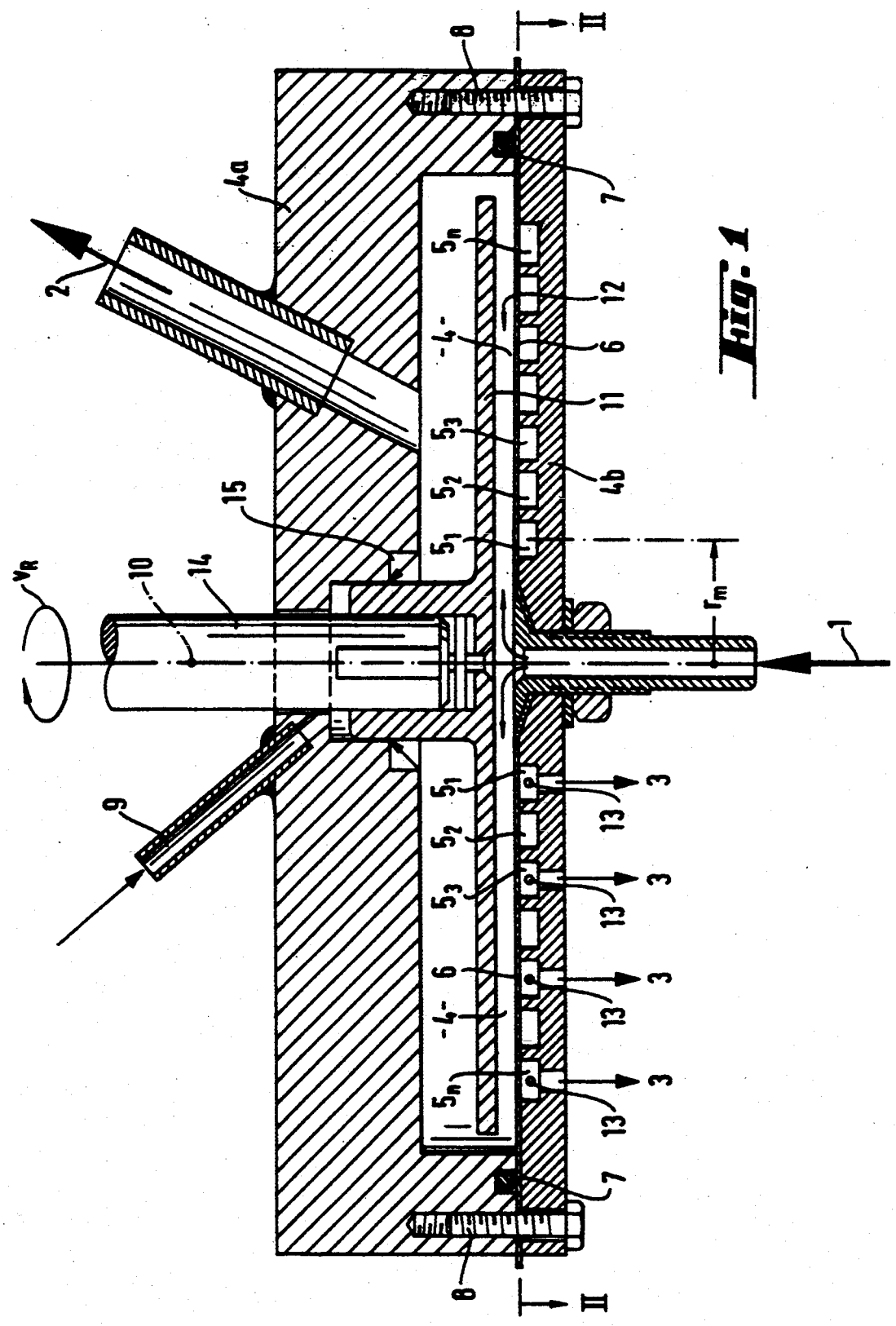

The apparatus shown in FIGS. 1 and 2 is a ring channel differential rotational shearing gap filter separator.

A feed fluid is fed into a concentrate chamber 4, which is formed by a lid 4a and a bottom 4b, via a central feed fluid inlet 1 in the form of a hollow shaft. In the concentrate chamber 4 there is installed a rotatable member in the form of a rotatable disk 11. It is separated by a gap 12 from a substantially planar partially permeable wall which may be in the form of a porous membrane or a semipermeable membrane 6 supported by a support structure formed on the bottom 4b. Rotating the disk 11 induces a relative motion of the feed fluid in the gap 12 along the membrane 6, one of the possible effects being to avoid or diminish clogging of the membrane pores. A filtrate chamber 5 of the system is divided into several partial filtrate chambers or filtrate subchambers $5_1$ to $5_n$ which are arranged in this preferred embodiment as concentric rings in the bottom 4b around the rotational axis 10 of the rotatable disk 11. The suspension that was fed near the middle of the rotatable disk 11 is led to the outer edge of the concentrate chamber 4. The feed fluid is concentrated each time when passing a ring channel with a membrane and a connected partial filtrate chamber. The different filtrate fluids which are collected in the ring channels are drained by the filtrate outlets 3. Thus a differential separation process occurs. The different collected filtrate fluids can have different properties, e.g., different concentrations of particles. The remaining concentrate fluid is expelled by a concentrate outlet 2. In order to exchange the rotatable disk and the membrane easily, the housing of the filter separator is horizontally divided into two parts. Preferably, these two parts are connected by bolts 8 and a seal 7.

In a preferred embodiment of this invention, sensors 13 are provided in each filtrate subchamber $5_1, \ldots, 5_n$ or the outlet conduit 3 thereof. These sensors 13 may, e.g., be flow rate sensors, concentration sensors, pH sensors, viscosity sensors, or pressure sensors.

The filter separator may also in a further embodiment have radial sectors of membrane portions with different properties instead of the ring channel arrangements of FIG. 1. Several membranes can thus be installed and tested under the same circumstances.

The following two examples illustrate the invention.

EXAMPLE 1

In the differential filtration apparatus as described above, four different baker's yeast solutions were employed to determine the separation quality of a membrane. The flux in liters per hour for the four different solutions at the seven different ring channels was determined and the results are plotted in FIG. 3. As can be seen, the flux increases from the inner ring channel $5_1$ to the outer ring channel $5_n$. The dependency is particularly strong for the more diluted solution of 5 percent, while the other concentrations of 20 weight percent, 60 weight percent and 80 weight percent, respectively, show a smaller but still significant dependency of the flux upon the radius r of the annular channel. The filter membrane used for this experiment was a 0.2 micron nominal nylon membrane, marketed under the trademark "Ultipor ®" by Pall Corporation.

EXAMPLE 2

In this example a solution of homogenized *E. coli* was used in the same apparatus. The membrane employed was a 0.2 micron nominal PVDF membrane, commercially available from Pall Corporation under the trademark "Fluorodyne ®". FIG. 4 shows the dependency of the protein transmission plotted as the ordinate vs. the average radius $r_m$ of the ring channel in mm ranging from 25 to 85 mm. The corresponding local velocity $v_R$ of the rotor is also shown in FIG. 4. This local velocity above the membrane portion covering the respective ring channel was between about 6 and about 20 m/sec. The plotted data show that the transmission rate, which is the ratio of protein concentration in the filtrate to the protein concentration in the concentrate range from about 25 percent to 100 percent.

Test runs have been carried out with a PVDF membrane of 0.2 microns (commercially available under the trademark "Fluorodyne II ®" from Pall Corporation) under 200 mbar over 1.5 hours (crosses in the diagram) and with a 0.2 micron nylon membrane (commercially available under the trademark "Bio-inert II ®" from Pall Corporation) under a pressure of 700 mbar over 4.5 hours (dots in the diagram).

Attention is drawn to the fact that in this example the purpose was to determine how efficiently the membrane passed the homogenization products, i.e., the smaller protein molecules. For this test, a transmission of 100 percent is desirable. The results clearly demonstrate that from above roughly 55 mm average radius of the channel, the transmission is 100 percent.

Further, it is pointed out that the above examples are not about examining protein transmission globally, but for a special protein in particular.

What is claimed is:

1. A dynamic filter separator comprising:
   a housing including a concentrate chamber, a feed fluid inlet communicating with the concentrate chamber, a filtrate chamber including a plurality of separate filtrate subchambers and filtrate outlets communicating with the filtrate chamber;
   a substantially planar partially permeable wall disposed in the housing and separating the concentrate chamber from the filtrate subchambers; and
   motion inducing means for inducing relative motion between a fluid in the concentrate chamber and the partially permeable wall.

2. A dynamic filter separator as claimed in claim 1 wherein the motion inducing means comprises a rotatable member rotatably disposed in the housing opposite the partially permeable wall and separated therefrom by a gap.

3. A dynamic filter separator as claimed in claim 2 wherein the rotatable member comprises a disk.

4. A dynamic filter separator as claimed in claim 2 wherein the rotatable member has a rotational axis, and the feed fluid inlet is disposed near to the rotational axis.

5. A dynamic filter separator as claimed in claim 2 wherein the housing comprises first and second detachable sections, and the rotatable member is detachably supported by one of the sections.

6. A dynamic filter separator as claimed in claim 1 wherein the housing comprises first and second detachable sections, and the partially permeable wall is detachably supported by one of the sections.

7. A dynamic filter separator as claimed in claim 1 wherein the partially permeable wall comprises a plurality of portions having different properties.

8. A dynamic filter separator as claimed in claim 7 wherein the plurality of portions comprise a plurality of concentric rings.

9. A dynamic filter separator as claimed in claim 7 wherein the plurality of portions comprise a plurality of radial sectors.

10. A dynamic filter separator as claimed in claim 1 comprising a sensor disposed in one of the filtrate subchambers.

11. A dynamic filter separator as claimed in claim 1 comprising a sensor disposed in the concentrate chamber.

12. A dynamic filter separator as claimed in claim 1 wherein the separate filtrate subchambers comprise concentric ring-shaped channels.

13. A dynamic filter separator as claimed in claim 1 further comprising a support structure for supporting the partially permeable wall in substantially a plane.

14. A dynamic filter separator as claimed in claim 13 wherein the plurality of filtrate subchambers are disposed in the support structure.

15. A dynamic filter separator as claimed in claim 14 wherein the filtrate subchambers comprise concentric ring shaped channels formed in the support structure.

16. A dynamic filter separator as claimed in claim 1 comprising a plurality of filtrate outlets, each of which communicates with a different one of the filtrate subchambers.

17. A dynamic filter separator comprising:
  a housing including a concentrate chamber, a feed fluid inlet communicating with the concentrate chamber, a filtrate chamber comprising a plurality of separate filtrate subchambers, and filtrate outlets communicating with the filtrate chamber;
  a membrane disposed in the housing and separating the concentrate chamber from the filtrate subchamber, each of the filtrate subchambers communicating with a different portion of the membrane; and
  a member disposed in the concentrate chamber and having a surface parallel to and spaced from the membrane, the member and the membrane being movable relative to one another in a direction substantially parallel to the membrane to induce relative motion between fluid in the concentrate chamber and the membrane.

18. A fluid separating method comprising:
  introducing a fluid into a concentrate chamber in a housing;
  inducing relative motion between the fluid in the concentrate chamber and a substantially planar partially permeable wall having different portions placed in the housing, such that the fluid has a component parallel to the partially permeable wall while causing filtrate to pass through the partially permeable wall; and
  separately collecting filtrate passing through different portions of the partially permeable wall within subchambers contacting said portions of the partially permeable wall.

19. A method as claimed in claim 18 wherein separately collecting the filtrate comprises collecting the filtrate in a plurality of separate filtrate subchambers separated from the concentrate chamber by the partially permeable wall.

20. A method as claimed in claim 19 comprising measuring a property of the filtrate in at least one of the filtrate subchambers.

21. A method as claimed in claim 19 comprising removing concentrate from the concentrate chamber.

22. A method as claimed in claim 18 wherein inducing relative motion comprises rotating a disk disposed in the concentrate chamber and spaced from the partially permeable wall by a gap.

23. A fluid separating method comprising:
  introducing a fluid into a concentrate chamber in a housing;
  producing relative motion between a membrane having different portions in contact with the fluid in the concentrate chamber and a member disposed in the concentrate chamber and having a surface parallel to and spaced from the membrane to induce relative motion between the fluid in the concentrate chamber and the membrane while causing filtrate to pass through the membrane; and
  collecting filtrate passing through different portions of the membrane in separate filtrate subchambers.

* * * * *